United States Patent
Hamada

(10) Patent No.: US 12,512,271 B2
(45) Date of Patent: Dec. 30, 2025

(54) ELECTRONIC COMPONENT

(71) Applicant: Murata Manufacturing Co., Ltd., Nagaokakyo (JP)

(72) Inventor: Daisuke Hamada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 120 days.

(21) Appl. No.: 18/637,610

(22) Filed: Apr. 17, 2024

(65) Prior Publication Data
US 2024/0274366 A1    Aug. 15, 2024

Related U.S. Application Data

(63) Continuation of application No. PCT/JP2022/046715, filed on Dec. 19, 2022.

(30) Foreign Application Priority Data

Dec. 23, 2021 (JP) .................. 2021-209094

(51) Int. Cl.
*H01G 4/30* (2006.01)
*H01G 4/008* (2006.01)
(Continued)

(52) U.S. Cl.
CPC .............. *H01G 4/30* (2013.01); *H01G 4/008* (2013.01); *H01G 4/012* (2013.01); *H01G 4/1227* (2013.01)

(58) Field of Classification Search
CPC .......... H01G 4/30; H01G 4/008; H01G 4/012; H01G 4/1227
See application file for complete search history.

(56) References Cited

U.S. PATENT DOCUMENTS

| | | | |
|---|---|---|---|
| 7,277,268 B2 * | 10/2007 | Celik .................. | H01G 4/0085 361/306.3 |
| 2009/0067117 A1 * | 3/2009 | Kasuya .................. | H01G 4/30 156/89.18 |

(Continued)

FOREIGN PATENT DOCUMENTS

| | | |
|---|---|---|
| JP | 2017107909 A | 6/2017 |
| JP | 2019009222 A | 1/2019 |

(Continued)

OTHER PUBLICATIONS

International Search Report in PCT/JP2022/046715, mailed Feb. 28, 2023, 3 pages.

(Continued)

*Primary Examiner* — Michael P McFadden
(74) *Attorney, Agent, or Firm* — Keating & Bennett, LLP

(57) ABSTRACT

An electronic component includes first solid solution layer in which a first metal component as a primary component defining a solid solution with a second metal component is located at an interface with a dielectric layer in an end region nearer than a position that is about 5% or more and about 20% or less of a length-direction distance or about 10 μm or more and about 50 μm or less from an end surface of an extended portion of the inner electrode layer to the end surface, and a second solid solution layer in which the first metal component defining a solid solution with the second metal component and with a higher concentration than a concentration in the first solid solution layer is located at an interface with the dielectric layer in a central region of the facing portion in a length direction and a width direction.

13 Claims, 6 Drawing Sheets

(51) Int. Cl.
   H01G 4/012    (2006.01)
   H01G 4/12     (2006.01)

(56) References Cited

U.S. PATENT DOCUMENTS

| | | | |
|---|---|---|---|
| 2010/0091426 A1* | 4/2010 | Motoki | H01C 7/18 |
| | | | 29/25.42 |
| 2013/0321980 A1* | 12/2013 | Suzuki | H01G 4/1227 |
| | | | 29/25.42 |
| 2016/0276102 A1 | 9/2016 | Suzuki et al. | |
| 2017/0162326 A1 | 6/2017 | Kowase | |
| 2018/0374643 A1 | 12/2018 | Inomata et al. | |
| 2020/0058442 A1* | 2/2020 | Cha | H01G 4/12 |
| 2020/0058444 A1* | 2/2020 | Cha | H01G 4/12 |
| 2020/0066452 A1* | 2/2020 | Cha | H01G 4/30 |
| 2021/0202172 A1 | 7/2021 | Kanzaki et al. | |
| 2022/0157523 A1* | 5/2022 | Lee | H01G 4/008 |
| 2023/0084921 A1* | 3/2023 | Masuda | C04B 35/4682 |
| | | | 361/301.4 |

FOREIGN PATENT DOCUMENTS

| | | |
|---|---|---|
| JP | 2021103711 A | 7/2021 |
| WO | 2013047281 A1 | 4/2013 |
| WO | 2015087688 A1 | 6/2015 |

OTHER PUBLICATIONS

Written Opinion in PCT/JP2022/046715, mailed Feb. 28, 2023, 3 pages.

* cited by examiner

ELECTRONIC COMPONENT

CROSS REFERENCE TO RELATED APPLICATIONS

This application claims the benefit of priority to Japanese Patent Application No. 2021-209094 filed on Dec. 23, 2021 and is a Continuation Application of PCT Application No. PCT/JP2022/046715 filed on Dec. 19, 2022. The entire contents of each application are hereby incorporated herein by reference.

BACKGROUND OF THE INVENTION

1. Field of the Invention

The present invention relates to electronic components.

2. Description of the Related Art

For example, an electronic component serving as a multilayer ceramic capacitor includes a multilayer body in which a plurality of dielectric layers and a plurality of inner electrode layers are alternately stacked and two outer electrodes disposed on respective end surfaces located on both sides of the multilayer body in a length direction (refer to Japanese Unexamined Patent Application Publication No. 2019-09222).

Such an electronic component is required to have high reliability when a voltage is applied.

SUMMARY OF THE INVENTION

Example embodiments of the present invention provide electronic components each having high reliability when a voltage is applied.

An example embodiment of the present invention provides an electronic component including a multilayer body including a plurality of dielectric layers and a plurality of inner electrode layers alternately stacked, and two outer electrodes on respective end surfaces of the multilayer body in a length direction. The plurality of inner electrode layers include first inner electrode layers and second inner electrode layers alternately provided. The first inner electrode layers include a facing portion opposing an adjacent second inner electrode layer in a stacking direction and an extended portion extending from the facing portion to one of the end surfaces and coupled to the outer electrode on the one of the end surfaces. The second inner electrode layers include a facing portion and an extended portion extending from the facing portion to another of the end surfaces and coupled to the outer electrode disposed on the another of the end surfaces. A first solid solution layer in which a first metal component defining a primary component of the plurality of inner electrode layers defines a solid solution with a second metal component different from the first metal component is located at an interface with the dielectric layer in an end region nearer than a position that is about 5% or more and about 20% or less of a length-direction distance or about 10 μm or more and about 50 μm or less from the end surface of the extended portion to the end surface, and a second solid solution layer in which the first metal component defines a solid solution with the second metal component having a higher concentration than a concentration in the first solid solution layer is located at an interface with the dielectric layer in a central region of the facing portion in the length direction and a width direction.

According to example embodiments of the present invention, electronic components each having high reliability when a voltage is applied are able to be provided.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described in detail below with reference to the drawings.

Figure 1:
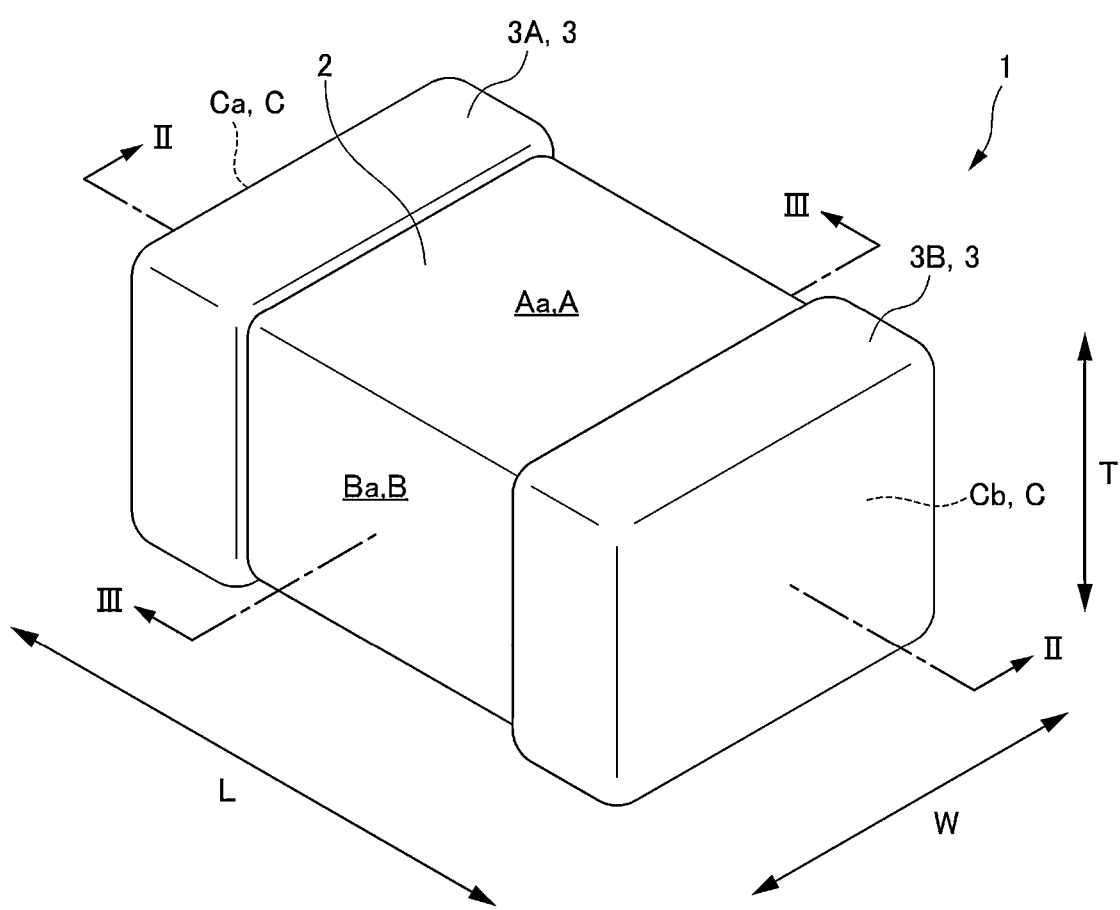
FIG. 1 is a schematic perspective view of a multilayer ceramic capacitor 1 according to an example embodiment of the present invention.
Figure 2:
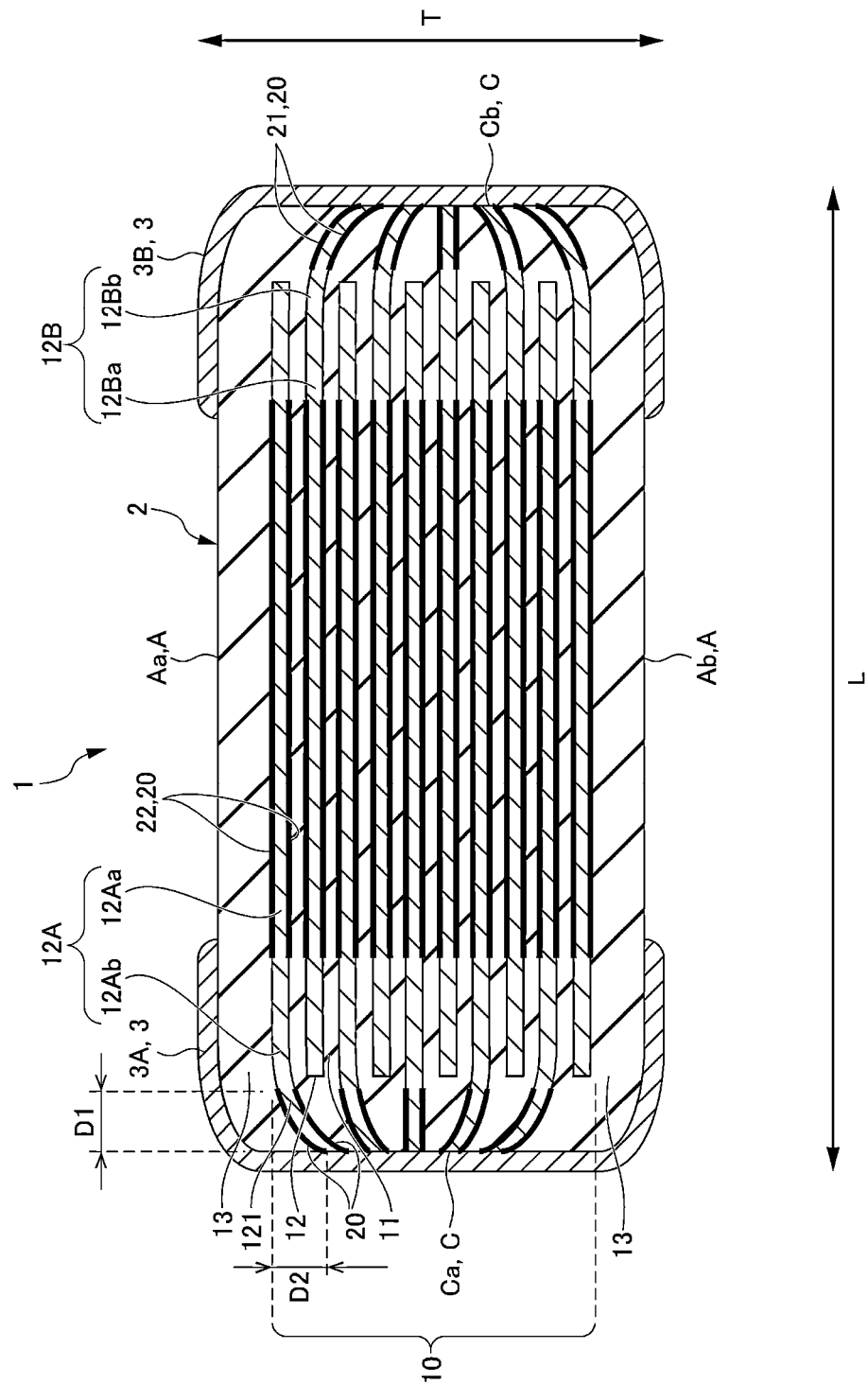
FIG. 2 is a sectional view of the section of the multilayer ceramic capacitor 1, taken along line II-II in FIG. 1.
Figure 3:
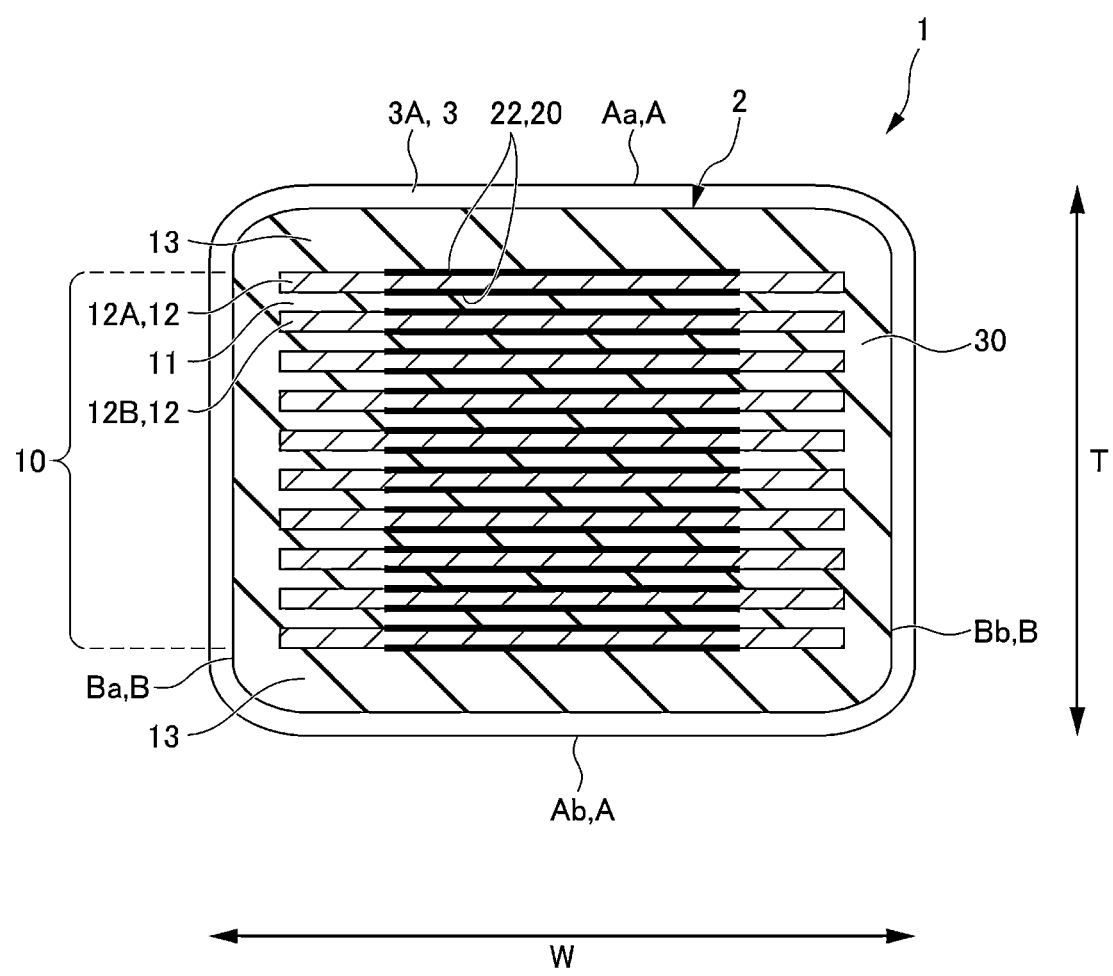
FIG. 3 is a sectional view of the section of the multilayer ceramic capacitor 1, taken along line III-III in FIG. 1.

A multilayer ceramic capacitor 1 according to an example embodiment of the present invention will be described below. FIG. 1 is a schematic perspective view of the multilayer ceramic capacitor 1 according to the present example embodiment. FIG. 2 is a sectional view of the section of the multilayer ceramic capacitor 1, taken along line II-II in FIG. 1. FIG. 3 is a sectional view of the section of the multilayer ceramic capacitor 1, taken along line III-III in FIG. 1.

The multilayer ceramic capacitor 1 includes a multilayer body 2 and a pair of outer electrodes 3 disposed at both ends of the multilayer body 2. The multilayer body 2 includes an inner layer portion 10 in which dielectric layers 11 and inner electrode layers 12 are alternately stacked.

In the following description, regarding terms indicating the direction of the multilayer ceramic capacitor 1, a direction in which the pair of outer electrodes 3 are disposed in the multilayer ceramic capacitor 1 is denoted by a length direction L. A direction in which the dielectric layers 11 and the inner electrode layers 12 are stacked is denoted by a stacking direction T. A direction intersecting both the length direction L and the stacking direction T is denoted by a width direction W. In this regard, in the present example embodiment, the width direction W is orthogonal or substantially orthogonal to both the length direction L and the stacking direction T. The stacking direction T is also referred to as a thickness direction.

The multilayer ceramic capacitor 1 has, for example, a withstand voltage of about 16 V. In addition, for example, the shape is a rectangular or substantially rectangular parallelepiped, the length direction L dimension is about 0.09 mm or more and about 1.1 mm, the width direction W dimension is about 0.004 mm or more and about 0.6 mm, and the thickness direction (stacking direction T) dimension is about 0.004 mm or more and about 0.6 mm.

In this regard, in the following description, of six outer surfaces of the multilayer body 2, a pair of outer surfaces opposite to each other in the stacking direction T are denoted by a first principal surface Aa and a second principal surface Ab, a pair of outer surfaces opposite to each other in the width direction W are denoted by a first side surface Ba and a second side surface Bb, and a pair of outer surfaces opposite to each other in the length direction L are denoted by a first end surface Ca and a second end surface Cb. In this regard, when there is no need for different descriptions between the first principal surface Aa and the second principal surface Ab, these are generically described as principal surface A, when there is no need for different descriptions between the first side surface Ba and the second side surface Bb, these are generically described as side surface B, and when there is no need for different descriptions between the first end surface Ca and the second end surface Cb, these are generically described as end surface C.

Multilayer Body 2

The multilayer body 2 includes an inner layer portion 10, outer layer portions 13 disposed on respective sides of the inner layer portion 10 in the stacking direction T, and side gap portions 30 disposed on both sides of the inner layer portion 10 and the outer layer portions 13 in the width direction W.

Inner Layer Portion 10

In the inner layer portion 10, the dielectric layers 11 and the inner electrode layers 12 are alternately stacked one by one.

Dielectric Layer 11

The dielectric layer 11 is produced by, for example, sintering a ceramic green sheet obtained by molding a slurry in which a binder, additives such as a plasticizer and a dispersing agent, and an organic solvent are added to a mixture into the shape of a sheet, where the mixture is produced by mixing a ceramic powder that is $BaTiO_3$, a glass component, and a sintering auxiliary added as the situation demands. The thickness of the dielectric layer 11 is, for example, about 0.3 μm or more and about 0.8 μm or less. The number of the dielectric layers 11 is, for example, 50 or more and 1,000 or less.

Inner Electrode Layer 12

The inner electrode layer 12 is produced by, for example, sintering an inner electrode layer paste including a powder of a first metal component as a primary component, a binder, additives such as a plasticizer and a dispersing agent, an organic solvent, and the like. The first metal component as a primary component of the inner electrode layer 12 is, for example, Ni in the present example embodiment, and in the following description, the first metal component is assumed to be Ni.

The inner electrode layer 12 includes a plurality of first inner electrode layers 12A and a plurality of second inner electrode layers 12B. The first inner electrode layers 12A and the second inner electrode layers 12B are alternately disposed. The thickness of the inner electrode layer 12 is, for example, about 0.3 μm or more and about 0.8 μm or less. The number of the inner electrode layers 12 is, for example, 50 or more and 1,000 or less in total of the first inner electrode layers 12A and the second inner electrode layers 12B.

The first inner electrode layer 12A includes a first facing portion 12Aa opposing the second inner electrode layer 12B and a first extended portion 12Ab extending from the first facing portion 12Aa to the first end surface Ca. An end portion of the first extended portion 12Ab is exposed at the first end surface Ca and is electrically coupled to the first outer electrode 3A described later.

The second inner electrode layer 12B includes a second facing portion 12Ba opposing the first inner electrode layer 12A and a second extended portion 12Bb extending from the second facing portion 12Ba to the second end surface Cb. An end portion of the second extended portion 12Bb is electrically coupled to the second outer electrode 3B described later. Then, an electric charge is accumulated in the first facing portion 12Aa of the first inner electrode layer 12A and the second facing portion 12Ba of the second inner electrode layer 12B.

In this regard, when there is no need for different descriptions between the first facing portion 12Aa and the second facing portion 12Ba, these are generically described as facing portion 12a, and when there is no need for different descriptions between the first extended portion 12Ab and the second extended portion 12Bb, these are generically described as extended portion 12b.

Curved Portion 121

The extended portion 12b of the inner electrode layer 12 includes a curved portion 121. FIG. 2 illustrates a cross section that passes a central portion in the width direction W intersecting the stacking direction T and the length direction L and that extends in the stacking direction T and the length direction L. As illustrated in FIG. 2, the curved portion 121 is disposed in an end region nearer than a position of distance D1 to the end surface C. The distance D1 is, for example, a position about 5% or more and about 20% or less of a length-direction distance or about 10 μm or more and about 50 μm or less from the end surface. The curved portion 121 curves toward the central portion in the stacking direction T with increasing proximity to the end surface C from the facing portion 12a side.

The inner electrode layer 12 in the central portion in the stacking direction T has the lowest degree of curving of the curved portion 121, and in the present example embodiment, the curved portion 121 of the inner electrode layer 12 at the center in the stacking direction T is a straight or substantially straight line. The degree of curving of the curved portion 121 becomes higher with increasing proximity to the principal surface A. That is, the degree of curving of the curved portion 121 in the inner electrode layer 12 nearest to the principal surface A is the highest. In other words, the degree of curving of the curved portion 121 furthest from the central portion in the stacking direction T is the highest. In the inner electrode layer 12 nearest to the principal surface A, a distance D2 between the position of the end-surface-C-side end portion of the curved portion 121 in the stacking direction T and the position of the facing portion 12a in the stacking direction T is, for example, about 5 μm or more and about 50 μm or less.

Solid Solution Layer 20

Further, for example, a solid solution layer 20 in which Ni as a first metal component defines a solid solution with a second metal component different from the first metal component is disposed at an interface with the dielectric layer 11 or the outer layer portion 13 on both sides of the inner electrode layer 12 in the stacking direction T. The solid solution layer 20 includes a first solid solution layer 21 and a second solid solution layer 22. The second metal component is, for example, preferably Sn, In, Ga, Zn, Bi, Pb, Fe, V, Y, or Cu, the second metal component is, for example, Sn in the present example embodiment, and in the following description, the second metal component is assumed to be Sn. In this regard, the solid solution layer 20 is a layer in which Ni atoms in a Ni atom arrangement structure are randomly substituted with Sn atoms while the Ni atom arrangement structure is maintained. The thickness of the solid solution layer 20 is, for example, about 1 nm or more and about 40 nm or less and preferably about 1 nm or more and about 20 nm.

In the present example embodiment, the solid solution layer 20 is disposed at interfaces on both sides of the inner electrode layer 12 in the stacking direction T. However, the solid solution layer 20 is not limited to this and may be disposed at an interface on only one side of the inner electrode layer 12 in the stacking direction T. In this regard, the solid solution layer 20 is disposed on every inner electrode layer 12 in the present example embodiment. However, the solid solution layer 20 is not limited to this, and the solid solution layer 20 may be disposed on only a portion of the inner electrode layers 12.

First Solid Solution Layer 2

The first solid solution layer 21 is disposed at an interface with the dielectric layer 11 or the outer layer portion 13 of the curved portion 121. In the first solid solution layer 21, for example, about 0.2 mol or more and about 0.8 mol or less of Sn relative to 100 mol of Ni is included in a solid solution, although the present invention is not limited to this. Ten points in interfaces of the central portion in the stacking direction and the central portion in the width direction are subjected to measurement by TEM analysis, and an averaged value is used. The interface not only denotes a boundary but also denotes a region that may include a portion of the inner electrode layer 12 and the dielectric layer 11 or the outer layer portion 13.

In the present example embodiment, the first solid solution layer 21 is disposed on only the curved portion 121 of the inner electrode layer 12. However, the first solid solution layer 21 is not limited to this and may extend to a non-curved portion of the extended portion 12b or a peripheral region of the facing portion 12a.

Second Solid Solution Layer 22

The second solid solution layer 22 is disposed at an interface with the dielectric layer 11 or the outer layer portion 13 in the central region of the facing portion 12a in the length direction L and the width direction W. The central region is a region, for example, nearer than a position about 10 μm or more and about 100 μm or less from the perimeter of the facing portion 12a to the center. In this regard, the central region of the facing portion 12a in the length direction L and the width direction W is also a central region of the multilayer body 2 in the length direction L and the width direction W.

The concentration of Sn relative to Ni in the second solid solution layer 22 is higher than that in the first solid solution layer 21. In the second solid solution layer 22, for example, about 1.5 mol or more and about 2.5 mol or less of Sn relative to 100 mol of Ni is included in a solid solution, although the present invention is not limited to this. Ten points of interfaces in the central portion in the stacking direction, the central portion in the width direction, and the central portion in the length direction are subjected to measurement by TEM analysis, and an averaged value is used. In this regard, the interface not only denotes a boundary but also denotes a region that may include a portion of the inner electrode layer 12 and the dielectric layer 11 or the outer layer portion 13.

Outer Layer Portion 13

The outer layer portion 13 is disposed on both sides of the inner layer portion 10 in the stacking direction T and is made of the same dielectric ceramic material as the dielectric layer 11.

Side Gap Portion 30

The side gap portion 30 is disposed on both sides of the inner layer portion 10 and the outer layer portions 13 in the width direction W and is formed of the same dielectric ceramic material as the dielectric layer 11.

Outer Electrode 3

The outer electrode 3 is disposed on both end surfaces C of the multilayer body 2. The outer electrode 3 covers not only the end surface C but also a portion of the principal surface A and the side surface B on the end surface C side.

As described above, the end portion of the first extended portion 12Ab of the first inner electrode layer 12A is exposed at the first end surface Ca and is electrically coupled to the first outer electrode 3A. In addition, the end portion of the second extended portion 12Bb of the second inner electrode layer 12B is exposed at the second end surface Cb and is electrically coupled to the second outer electrode 3B. Accordingly, in the structure between the first outer electrode 3A and the second outer electrode 3B, a plurality of capacitor elements are electrically coupled in parallel.

Production Step

Figure 4:
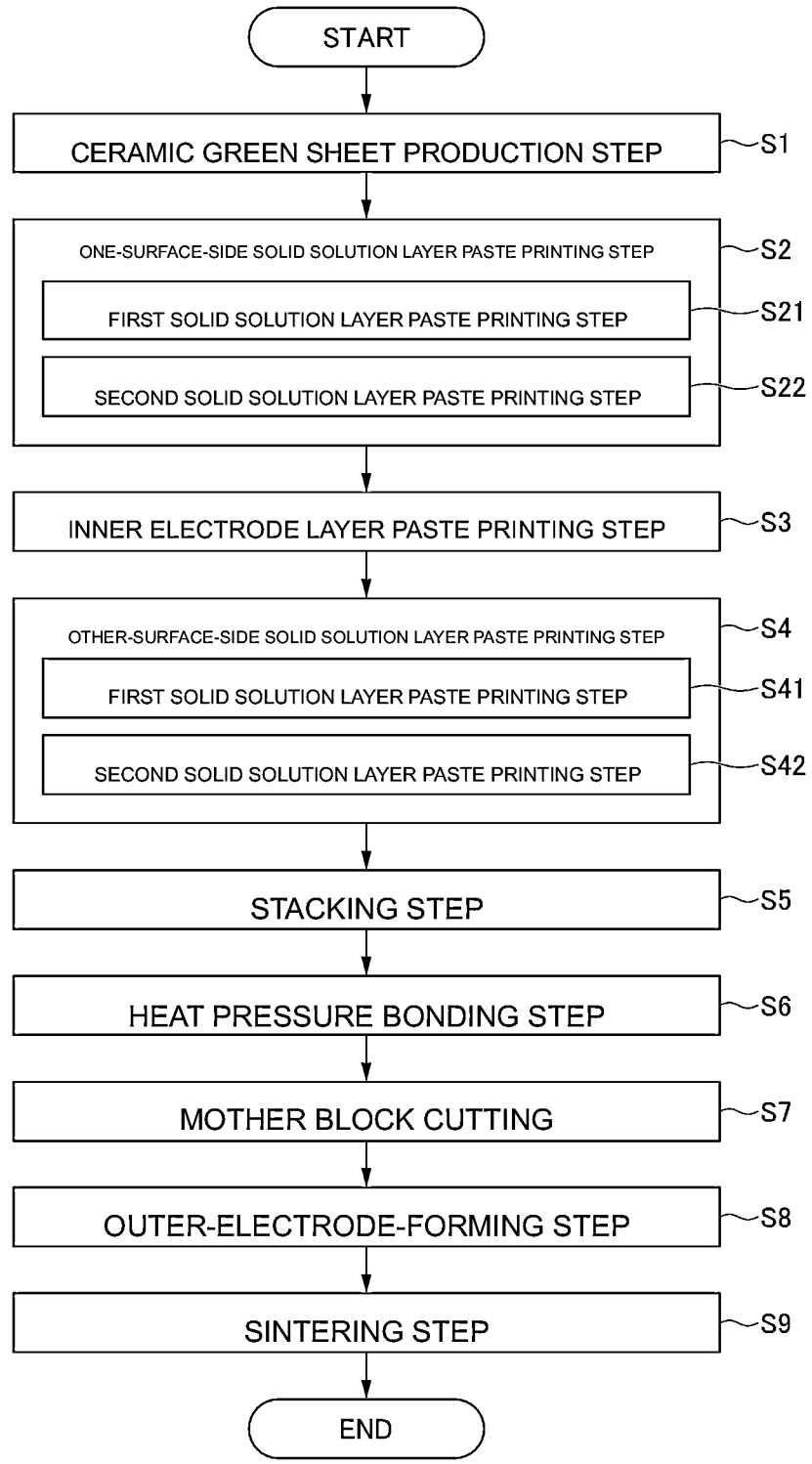
FIG. 4 is a flow chart illustrating an example of a method for manufacturing the multilayer ceramic capacitor 1.

FIG. 4 is a flow chart illustrating an example of a method for manufacturing the multilayer ceramic capacitor 1 according to the present example embodiment. This manufacturing method is an example, and the present invention is not limited to this. FIGS. 5A to 5F is a diagram illustrating steps of producing a multilayer sheet 103, described later, in the method for manufacturing the multilayer ceramic capacitor 1. The steps of producing the multilayer sheet 103 are also an example, and the present invention is not limited to this.

Ceramic Green Sheet Production Step S1

Figure 5A:
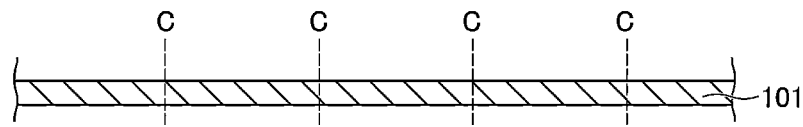
FIGS. 5A to 5F are diagrams illustrating steps of producing a multilayer sheet 103 in the method for manufacturing the multilayer ceramic capacitor 1.

A ceramic slurry including a ceramic powder, a binder, and a solvent is prepared. An inner layer portion ceramic green sheet 101 illustrated in FIG. 5A is produced by the resulting ceramic slurry being printed into the shape of a sheet on a carrier film by using, for example, a die coater, a gravure coater, a microgravure coater, or the like.

One-Surface-Side Solid Solution Layer Paste Printing Step S2

The one-surface-side solid solution layer paste printing step S2 includes a first solid solution layer paste printing step S21 and a second solid solution layer paste printing step S22.

First Solid Solution Layer Paste Printing Step S21

Figure 5B:
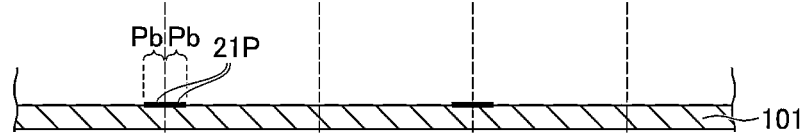

As illustrated in FIG. 5B, a first solid solution layer paste 21P is printed on the surface of the inner layer portion ceramic green sheet 101. The first solid solution layer paste 21P is printed in an end region of an extended portion forming region Pb finally forming the extended portion 12b. In the present example embodiment, for example, the first solid solution layer paste 21P includes about 2.5 mol of Sn relative to 100 mol of Ni.

Second Solid Solution Layer Paste Printing Step S22

Figure 5C:
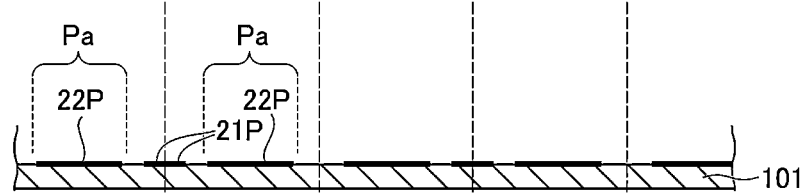

Subsequently, as illustrated in FIG. 5C, a second solid solution layer paste 22P is printed on the surface of the inner layer portion ceramic green sheet 101. The second solid solution layer paste 22P is printed in a central portion of a facing portion forming region Pa finally forming the facing portion 12a. The number of mols of Sn included in the second solid solution layer paste 22P relative to 100 mol of Ni is larger than the number of mols of Sn included in the first solid solution layer paste 21P relative to Ni. In the present example embodiment, the second solid solution layer paste 22P includes, for example, about 5 mol of Sn relative to 100 mol of Ni.

Inner Electrode Layer Paste Printing Step S3

Figure 5D:
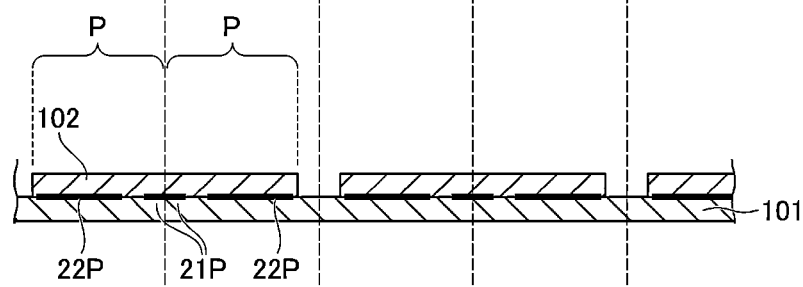

Next, as illustrated in FIG. 5D, an inner electrode layer paste 102 forming the inner electrode layer 12 is printed in an inner electrode forming region P in which the first solid solution layer paste 21P and the second solid solution layer paste 22P are printed and in which the extended portion forming region Pb and the facing portion forming region Pa are combined.

Other-Surface-Side Paste Printing Step S4

The other-surface-side paste printing step S4 also includes a first solid solution layer paste printing step S41 and a second solid solution layer paste printing step S42 similar to that in the one-surface-side solid solution layer paste printing step S2.

First Solid Solution Layer Paste Printing Step S41

Figure 5E:
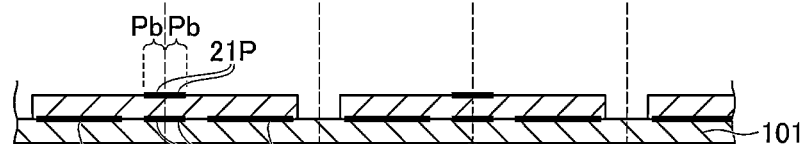

Initially, as illustrated in FIG. 5E, the first solid solution layer paste 21P is printed on the surface of the inner electrode layer paste 102.

Second Solid Solution Layer Paste Printing Step S42

Figure 5F:
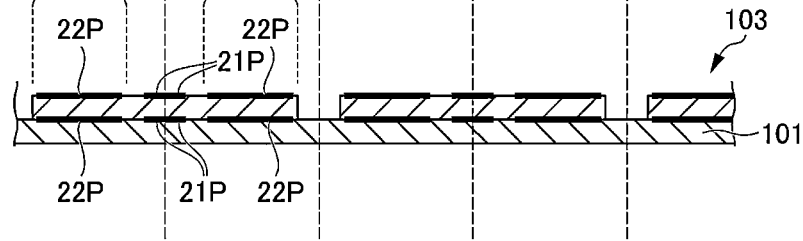

Subsequently, as illustrated in FIG. 5F, the second solid solution layer paste 22P is printed on the surface of the inner electrode layer paste 102.

According to the steps described above, a multilayer sheet 103 is produced.

Stacking Step S5

Figure 6:
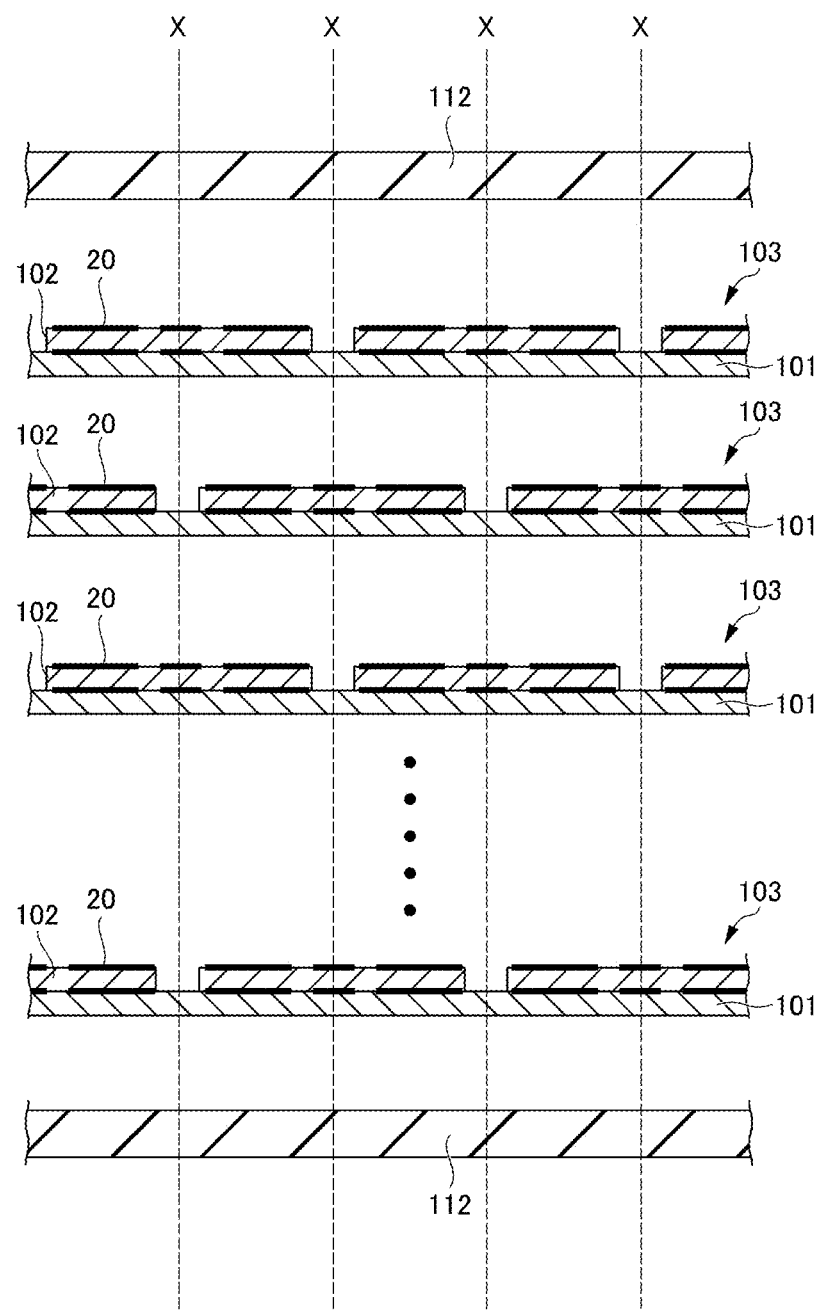
FIG. 6 is a diagram illustrating a stacking step in the method for manufacturing the multilayer ceramic capacitor 1.

Next, in the stacking step S5, a plurality of multilayer sheets 103 are stacked. FIG. 6 is a diagram illustrating the stacking step. As illustrated in FIG. 6, a plurality of multilayer sheets 103 are stacked so that the inner electrode forming regions P, in which the inner electrode layer paste 102 is printed, of adjacent multilayer sheets 103 are shifted by a half-pitch from each other. Further, an outer layer portion ceramic green sheet 112 is stacked on both sides of the plurality of stacked multilayer sheets 103.

Heat Pressure Bonding Step S6

Subsequently, the outer layer portion ceramic green sheets 112 and the plurality of stacked multilayer sheets 103 are heat-pressure bonded. Accordingly, a mother block 110 is formed.

Mother Block Cutting Step S7

Thereafter, the mother block 110 is cut along a cut line X illustrated in FIG. 6 and a cut line intersecting the cut line X which correspond to the dimensions of the multilayer body 2. Accordingly, a plurality of multilayer bodies 2 are produced.

Formation of Curved Portion 121

Regarding the resulting multilayer body 2, in a region from the portion defining the end surface C of the multilayer body 2 due to cutting along the cut line X to a portion a certain distance from the end surface C in the length direction L, portions of the multilayer sheets 103 on which the inner electrode layer paste 102 is printed and portions on which the inner electrode layer paste 102 is not printed are alternately stacked, and the inner electrode layer paste 102 in this portion defines the extended portion 12b.

On the other hand, in a region a certain distance or more apart from the end surface C, only portions of the multilayer sheets 103 on which the inner electrode layer paste 102 is printed are stacked and define the facing portions 12a.

That is, the thickness in the stacking direction T of the region defining the extended portion 12b is smaller than the thickness of the region defining the facing portion 12a since the number of layers of the inner electrode layer paste 102 is halved. Consequently, the curved portion 121 that curves with increasing proximity to the end surface C is formed in the end-surface-C-side end region of the extended portion 12b.

Outer-Electrode-Forming Step S8

Next, the outer electrode 3 is formed on the thin end-surface-C-side portion of the multilayer body 2.

Firing Step S9

Subsequently, the multilayer body 2 provided with the outer electrode 3 is heated at a predetermined firing temperature for a predetermined time in a nitrogen atmosphere. Accordingly, the multilayer ceramic capacitor 1 is produced. In such an instance, the inner layer portion ceramic green sheet 101 and the outer layer portion ceramic green sheet 112 are sintered so as to become ceramic and to form the dielectric layer 11 and the outer layer portion 13.

In the firing step S9, the inner electrode layer paste 102 becomes the inner electrode layer 12. In addition, the first solid solution layer paste 21P and the second solid solution layer paste 22P printed on both surfaces of the inner electrode layer paste 102 in the stacking direction T are heated so as to become the first solid solution layer 21 and the second solid solution layer 22, respectively.

The first solid solution layer 21 is formed at the interface with the dielectric layer 11 or the outer layer portion 13 in the end region of the extended portion 12b, and the second solid solution layer 22 is formed at the interface with the dielectric layer 11 or the outer layer portion 13 in the central region of the facing portion 12a in the length direction L and the width direction W.

According to the present example embodiment described above, the following advantageous effects are provided.

The curved portion 121 is formed by the extended portion 12b being deformed in the stacking step S5 and the heat pressure bonding step S6 due to the plurality of multilayer sheets 103 being stacked and pressed. The strength of a portion of the extended portion 12b which is formed into the curved portion 121 may be deteriorated due to the deformation.

However, in the present example embodiment, the first solid solution layer 21 is formed at interfaces on both sides of the curved portion 121 in the stacking direction T. Consequently, the strength of the curved portion 121 is improved, and the voltage resistance (withstand voltage) of the multilayer ceramic capacitor 1 is improved.

In this regard, the second solid solution layer 22 is formed at the interface with the dielectric layer 11 or the outer layer portion 13 in the central region of the facing portion 12a in the length direction L and the width direction W. Consequently, high reliability when a voltage is applied can be obtained.

Further, a state (electric barrier height) in the vicinity of the interface with the dielectric layer 11 of the curved portion 121 is changed due to Ni and Sn of a solid solution, and a high-temperature load life can be improved. Accordingly, the multilayer ceramic capacitor 1 capable of having excellent reliability when a voltage is applied can be provided.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a multilayer body including a plurality of dielectric layers and a plurality of inner electrode layers alternately stacked; and two outer electrodes on respective end surfaces of the multilayer body in a length direction; wherein the plurality of inner electrode layers include first inner electrode layers and second inner electrode layers alternately provided;

the first inner electrode layers include a first facing portion opposing adjacent second inner electrode layers in a stacking direction and a first extended portion extending from the first facing portion to one of the end surfaces and coupled to the outer electrode on the one of the end surfaces;

the second inner electrode layers include a second facing portion and a second extended portion extending from the second facing portion to another of the end surfaces and coupled to the outer electrode on the another of the end surfaces;

a first solid solution layer including a first metal component as a primary component of the plurality of inner electrode layers defines a solid solution with a second metal component different from the first metal component is located at an interface with the dielectric layer in an end region nearer than a position that is about 5% or more and about 20% or less of a length-direction distance or about 10 μm or more and about 50 μm or less from the end surface of the extended portion to the end surface; and a second solid solution layer in which the first metal component defines a solid solution with the second metal component with a higher concentration than a concentration in the first solid solution layer is located at an interface with the dielectric layer in a central region of the facing portion in the length direction and a width direction.

2. The electronic component according to claim 1, wherein the end region of the extended portion includes a curved portion that curves toward a central portion in the stacking direction with increasing proximity to the end surface from the facing portion side; and in an inner electrode layer furthest from the central portion in the stacking direction of the plurality of inner electrode layers, a distance between a position of an end-surface-side end portion of the extended portion in the stacking direction and a position of the facing portion in the stacking direction is about 5 μm or more and about 50 μm or less.

3. The electronic component according to claim 1, wherein, in the first solid solution layer, about 0.2 mol or more and about 0.8 mol or less of the second metal component relative to 100 mol of the first metal component is included in a solid solution.

4. The electronic component according to claim 1, wherein, in the second solid solution layer, about 1.5 mol or more and about 2.5 mol or less of the second metal component relative to 100 mol of the first metal component is included in a solid solution.

5. The electronic component according to claim 1, wherein a thickness of each of the plurality of inner electrode layers is about 0.3 μm or more and about 0.8 μm or less.

6. The electronic component according to claim 1, wherein a thickness of each of the plurality of dielectric layers is about 0.3 μm or more and about 0.8 μm or less.

7. The electronic component according to claim 1, wherein the first metal component is Ni.

8. The electronic component according to claim 1, wherein the second metal component is Sn, In, Ga, Zn, Bi, Pb, Fe, V, Y, or Cu.

9. The electronic component according to claim 1, wherein a thickness of the first solid solution layer and a thickness of the second solid solution layer are about 1 nm or more and about 20 nm or less.

10. The electronic component according to claim 1, wherein a length-direction dimension of the electronic component is about 0.09 mm or more and about 1.1 mm or less;

a width-direction dimension of the electronic component is about 0.004 mm or more and about 0.6 mm or less; and a thickness-direction dimension of the electronic component is about 0.004 mm or more and about 0.6 mm or less.

11. The electronic component according to claim 1, wherein each of the plurality of dielectric layers includes $BaTiO_3$, a glass component, and a sintered auxiliary.

12. The electronic component according to claim 1, wherein a number of the plurality of dielectric layers is 50 or more and 1000 or less.

13. The electronic component according to claim 1, wherein a number of the plurality of inner electrode layers is 50 or more and 1000 or less.

* * * * *